United States Patent
Guerra-Gonzalez et al.

(10) Patent No.: US 8,394,443 B2
(45) Date of Patent: Mar. 12, 2013

(54) MODIFIED WHEY POWDER AND PROCESS FOR PRODUCING THE SAME

(75) Inventors: Omar de Jesus Guerra-Gonzalez, Essen (DE); Bernard Rocklage, Bühl (DE); Hans-Peter Bernauer, Kirchheim (DE)

(73) Assignee: Kraft Foods R & D, Inc., Deerfield, IL (US)

(*) Notice: Subject to any disclaimer, the term of this patent is extended or adjusted under 35 U.S.C. 154(b) by 719 days.

(21) Appl. No.: 12/027,497

(22) Filed: Feb. 7, 2008

(65) Prior Publication Data

US 2008/0193623 A1    Aug. 14, 2008

(30) Foreign Application Priority Data

Feb. 7, 2007 (EP) .................................. 07002615

(51) Int. Cl.
*A23C 21/00*    (2006.01)
(52) U.S. Cl. .................. 426/583; 426/580; 426/491
(58) Field of Classification Search .................. 426/478, 426/490, 491, 580, 583, 656, 657
See application file for complete search history.

(56) References Cited

U.S. PATENT DOCUMENTS

| 2,477,558 A | 8/1949 | Almy et al. |
| 2,708,166 A | 5/1955 | Tumerman et al. |
| 3,166,486 A * | 1/1965 | Hull .............................. 204/540 |
| 4,497,836 A * | 2/1985 | Marquardt et al. ........... 426/239 |
| 5,118,516 A | 6/1992 | Shimatani et al. |
| 2006/0278217 A1 | 12/2006 | Theoleyre |

FOREIGN PATENT DOCUMENTS

EP    1 541 032 A2    6/2005

OTHER PUBLICATIONS

Remziye Yilmaz et al., "Lactose Crystallization From Deproteinized Whey in an Ethanolwater System", Milchwissenschaft, VV GMBH, Volkswirtschaftlicher Verlag. Munich, Germany, vol. 52, No. 11, 1997, pp. 629-631.

* cited by examiner

*Primary Examiner* — Leslie Wong
(74) *Attorney, Agent, or Firm* — Fitch Even Tabin & Flannery LLP

(57) ABSTRACT

The present invention relates to a process by which whey permeates or blends thereof can be converted to a modified whey powder (MWP) having low mineral content, low hygroscopicity, and advantageous organoleptic properties using a combination of ion-exchange demineralization and crystallization. The modified whey powder thus obtained is suitable for dry applications in the production of food products. Furthermore, the present invention relates to a modified whey powder (MWP) obtainable by said process and to products comprising said modified whey powder (MWP), such as confectionery, biscuits, and powdered soft drinks.

6 Claims, No Drawings

MODIFIED WHEY POWDER AND PROCESS FOR PRODUCING THE SAME

TECHNICAL FIELD OF THE INVENTION

The present invention relates to a process for producing a modified whey powder from whey permeate. In a further aspect, the present invention also relates to the modified whey powder produced by said process as well as products (e.g., confectionery; biscuits, and powdered soft drinks) that can be manufactured using this powder.

BACKGROUND ART

There are, in general, two kinds of whey that are produced as by-products during processing of milk in the manufacture of dairy products such as cheese and curd. These are commonly referred to as sweet whey and sour whey.

Sweet whey is also termed cheese whey and is produced during cheese making, when rennet (an enzyme derived from a calf's stomach) is used for curdling. The pH value of sweet whey can range between 5.2 and 6.7.

Sour whey comprises the whey type commonly known as acid whey and curd or cottage-cheese whey. Acid whey, also known as casein whey, originates from the manufacture of casein by means of lactic acid, lactic acid generating bacteria or hydrochloric acid. As suggested by their names, curd or cottage-cheese whey are produced during the manufacture of quark and cottage-cheese. Lactic acid generated by natural fermentation imparts a high acidity to the whey such that the pH values of these types of whey typically range from 3.8 to 4.6.

In some cases, sour sweet whey is also considered encompassed by this term although this may appear incorrect. If insufficient care is given to sweet whey (cheese whey) it becomes sour by continued natural fermentation and is then referred to as sour sweet whey. This additional fermentation process is usually not desired.

Typical compositions of these types of whey are shown in the following table:

|  | SWEET WHEY | SOUR WHEY |
| --- | --- | --- |
| Solids (% by weight) | 6.4-6.8 | 6.8 |
| Lactose (% by weight) | 4.8 | 4.3-4.4 |
| Protein (% by weight) | 0.75 | 0.8 |
| Fat (% by weight) | 0.05 | <0.01 |
| Ash (% by weight) | 0.6 | 0.80 |
| pH | 6.1 | 4.6 |

Reference: Zadow, J. G.: Whey and lactose processing, Elsevier Applied Science, 1992

If the whey is treated by means of ultrafiltration to recover valuable proteins, the product stream with lower protein content is the so-called whey permeate. Whey permeate is therefore also a by-product of cheese manufacture which accrues during protein recovery from whey by means of ultrafiltration.

Its use in downstream dairy processes and food production is limited due to the high mineral content and the poor sweetness. Therefore, so far whey permeate is brought to the market as a very low value product, being used in fertilizer and animal feed.

Applications of whey permeate creating more value are desirable. This could be accomplished by providing a method to transform whey permeate into a raw material for "dry applications" such as confectionery, biscuits, powdered soft drinks and other categories.

In the past, sweet whey powder (SWP) has been employed as a low-price substitute for sucrose in confectioneries and, in particular, in chocolate. However, any further increase of the SWP content and, thus, a further reduction of the costs of the ingredients is limited by
- the mineral content which leads to undesirable off-flavours,
- the high content of α-lactose which is the crystalline form of lactose usually resulting from spray-drying and which causes a powdery mouthfeel and lack of sweetness, both of which is undesirable in chocolate products, and, independently,
- the whey proteins present in SWP are not available for other economically more beneficial applications such as valuable nutrition products although they appear to have no functionality in chocolate products.

In particular in view of the latter issue, it is desirable to replace the SWP in chocolate products by another raw material that is available at lower costs, for instance, a powdery raw material derived from whey, in particular, whey permeate.

It is essential that such a raw material for dry applications has immaculate flavour properties and processability, i.e. no salty or metallic off-flavour and a low tendency of caking. The latter is important not only for later applications but also during manufacture, for instance, by spray-drying. Advantageous caking properties can be achieved if the formation of amorphous forms of lactose during drying is avoided. Furthermore, whey permeates originating from cottage cheese and casein production is known to be difficult to dry due to its high content of lactic acid. It tends to agglomerate and form lumps upon spray-drying. Independently, a method has to be found to lower the mineral content of whey permeate.

Removal of minerals in whey and whey permeate has, for instance, been addressed in the following prior art documents:

Zadow (in "Whey and Lactose Processing", Elsevier 1992, pages 83-85) discloses the processes of ion-exchange, lactose crystallization and spray-drying and shows some linkage between them. The reference mentions the influence of crystallization on the hygroscopicity of the product and, hence, on the processability during spray-drying, but the reference does not teach that this step is not sufficient to achieve good processability, but a previous demineralization step is necessary.

WO 02/50089 discloses a method for purification of lactose in a whey product using two demineralization steps and an additional crystallization step. The second demineralization step includes the addition of alcohol in order to precipitate minerals. This reference is related to the production of edible high-purity lactose (99.8%). Treating the whey with ion-exchange resin(s) is mentioned as a method suitable for the first demineralization step in order to remove divalent ions, although disadvantages of an ion-exchange step are discussed.

US Patent Publication 2003/0000894 discloses a process for treating liquids, such as a citric acid fermentation broth, including a nanofiltration step and an ion-exchange step.

U.S. Pat. No. 6,475,390 and EP-A-01541032, both emanating from PCT/AU98/00588, disclose a process for purifying biological molecules, such as lactose, from dairy streams, such as sweet cheese whey permeate or acid whey permeate, which combines two demineralization steps. A cation exchanger is used to remove the divalent cations in the first step and nanofiltration is used to remove monovalent ions in the second step. The permeate of the nanofiltration step is used to regenerate the ion exchanger resins.

EP-A-0083325 discloses a process for the manufacture of a sweetener, in which lactose is dissolved in water and subsequently hydrolyzed to glucose and galactose by means of a strongly acidic cation exchanger.

U.S. Pat. No. 4,971,701, U.S. Pat. No. 6,033,700, EP-A-0315135, and EP-A-0835610 disclose processes for removing at least a portion of salts contained in whey by means of electro-deionization using ion-exchange membranes. U.S. Pat. No. 6,033,700 and EP-A-0835610 mention that demineralized milk and milk derivatives may be useful for replacing skimmed milk in the manufacture of confectionery-chocolate. Acid whey and sweet whey obtained from an ultrafiltration step are mentioned as starting materials for the disclosed deionization process. However, neither of these prior art references contain any teaching regarding the organoleptic properties of the obtained demineralized whey products and their suitability in confectionery such as chocolate and other products. Thus, there still remains a need for solutions to the problems outlined hereinabove, viz. to provide a process for producing whey powder from whey permeate suitable to be used in biscuits, powdered soft drinks, and confectionery products, including chocolate products.

SUMMARY

In a first aspect, the present invention relates to a process by which blends of whey and whey permeates can be converted to powders having a low mineral content, a low hygroscopicity, and advantageous organoleptic properties by a combination of ion-exchange demineralization and crystallization.

In a further aspect, the present invention relates to a modified whey powder (MWP) obtainable by said process. The present invention aims to provide a modified whey powder that has a lactose content higher than 80%, preferably higher than 85%, but lower than 95%. We have also found that the caking properties of the MWP improve significantly if a higher degree of demineralization is obtained.

In a still further aspect, the present invention relates to products comprising said modified whey powder (MWP), such as confectionery and biscuits.

DETAILED DESCRIPTION

I. Process a) Providing Whey Permeate

In the context of the present invention, the term "whey permeate" relates to whey that has been separated from the curd. Suitable techniques for separating whey from curd include ultrafiltration (UF) and nanofiltration (NF). Depending on the technique by which the whey permeate has been obtained, it can be referred to as "UF whey permeate" and "NF whey permeate", respectively. In the context of the present invention, the term "whey permeate" encompasses any whey permeate, i.e. UF whey permeate, NF whey permeate and blends thereof. Since whey protein can be marketed as valuable nutrition products, it is advantageous from an economic point of view to separate whey protein from whey prior to further processing of the whey.

Ultrafiltration is a variety of membrane filtration in which hydrostatic pressure forces a liquid against a semipermeable membrane. Suspended solids and solutes of high molecular weight are retained, while water and low molecular weight solutes pass through the membrane. This separation process is suitable for purifying and concentrating macromolecular solutions, i.e. solution containing compounds having a molecular weight in the range of about $10^3$ to $10^6$ Da, especially protein solutions.

In a preferred embodiment of the present invention, a blend of whey permeates from different cheese manufactures is used.

The present invention relates to whey permeates or blends thereof. Generally, the whey permeates used in the present invention have low protein content and high mineral content. Blends of whey permeate having a high variability composition may be used. The mineral content is commonly also referred to, and determined, as ash content. The term "ash" thus comprises all compounds that are not considered organic or water. These are the compounds that remain (as "ashes") after a sample is burned, and consist mostly of metal oxides. It includes salts of alkali metals, alkaline earth metals, and transition metals. Specific examples of ions included in ash include, for example, Na, K, Mg, Ca, Al, Mn, Fe, Si, and ions derived from phosphorus; other ions may be present as well.

The whey permeate used in the present invention is generally characterized by the following features:

Ash/lactose ratio: 0.13 or higher, for instance 0.16 or higher; and

Ash/dry matter ratio: 7% or higher.

The absolute lactose content depends on the concentration and therefore on the total solids content of the incoming product.

Preferably, the whey permeate is pasteurized prior to further processing. The meaning of the term "pasteurizing" is well known to the skilled person. In general, it relates to any method of heating food for the purpose of killing harmful organisms such as bacteria, viruses, protozoa, molds, and yeasts. Unlike sterilization, pasteurization is not intended to kill all microorganisms in the food. Instead, pasteurization aims to achieve a reduction of the number of viable organisms by several orders of magnitude so that they are unlikely to cause disease (assuming the pasteurized product is refrigerated and consumed before its expiration date).

There are two widely used methods to pasteurize milk: high temperature/short time (HTST) and ultra-high temperature (UHT). HTST is by far the most common method. It involves holding milk at a temperature of 72° C. for at least 15 seconds. UHT involves holding milk at a temperature of 138° C. for at least two seconds. Pasteurization methods are usually standardized and controlled by national food safety authorities. There are different standards for different dairy products, depending on the fat content and the intended usage.

Generally, in the present invention, any pasteurization method suitable for achieving a reduction of the number of viable microorganisms by a factor $10^{-5}$ in milk can be employed. This is considered adequate for destroying almost all yeasts, mold, and spoilage bacteria and also to ensure adequate destruction of common pathogenic heat-resistant organisms including particularly *Mycobacterium tuberculosis*, and *Coxiella burnetii*. Processes must be designed, so that the whey permeate is subject to the required temperature and time conditions.

In the present invention, it is preferred to apply a HTST pasteurization treatment to the whey permeate prior to treatment in the present process. A typical procedure may include heating the whey permeate from its storage temperature to 74° C. for 13.5 seconds and cooling it immediately afterwards to a temperature of about 4° C.

b) Demineralization

The whey permeate is demineralized by an ion exchange process, i.e. by passing the whey permeate over a cation exchange resin and an anion exchange resin. Also other demineralization pre-treatments can be carried out before the ion-exchangers to lower the overall operation costs. Possible pre-treatments include nanofiltration, pH-treatment with subsequent separation of precipitates, heat treatment with subsequent separation of precipitates or combinations of these.

The term "ion exchange" relates to a reversible chemical process wherein ions are exchanged between a solution and an ion exchanger, that is usually an insoluble solid or gel. Typical ion exchangers are ion exchange resins, zeolite, montmorillonite, clay. Since the properties of ion exchange resins can be adjusted according to the requirements of a specific process, ion exchange resins are preferred with respect to the present invention. The resins can allow removal of different ions. Suitable examples of such resins include Lewatit resins 5100 and MP 62. Ion-specific resins may be used if some ions have previously been removed by a pre-treatment.

Numerous types of ion exchange resins suitable for the present invention are available on the market under various tradenames.

The temperature of the whey permeate during the demineralization step can be in the range of from about 4 to about 10° C. Typically, conductivity, Brix value, and/or pH of the whey permeate is monitored during demineralization. The degree of demineralization DD is about 80 to 95% and more preferably about 85 to 95%. DD is calculated according to the following equation:

$$DD=(IB-IA)/IB,$$

wherein IB is the concentration of ions in mol/l in the whey permeate before the ion exchange step and IA is the concentration of ions in mol/l after the ion exchange step.

In particular, the following ion-specific degree of demineralization should be achieved:

| Chloride: | 95% or more |
| Phosphorus-derived ions: | 85-95% |
| Calcium: | 60-70% |
| Potassium: | 90% or more |
| Sodium: | 90% or more |
| Magnesium: | 50% or more | c) Crystallization of Lactose

The crystallization step comprises concentrating the demineralized whey permeate prior to a rest period during which crystals of lactose are formed.

Concentrating the demineralized whey permeate is preferably accomplished by partial evaporation which can be carried out by any method of evaporation commonly known in the art. Typically, the demineralized whey permeate is heated to an elevated temperature in order to decrease the time necessary the partial evaporation step.

Evaporation can be controlled by monitoring the density of the demineralized whey permeate. After the desired density of the demineralized whey permeate has been accomplished, the demineralized whey permeate is transferred to a crystallization vessel. If evaporation has been carried out at elevated temperature, this temperature should be maintained during the transfer in order to avoid premature crystallization outside the crystallization vessel. Premature crystallization, for instance, in the piping between the concentration equipment and the crystallization equipment is undesired as it may lead to the formation of deposits that complicate cleaning and maintaining of the equipment and might even provoke clogging. In the final stage of the evaporator a high temperature should be kept to avoid spontaneous crystallization of the lactose (higher than ca. 45° C.).

The content of total solids after evaporation, e.g. in a four-stage evaporator, should be as high as possible, at least 55%, preferably at least 60%. To determine the total content of solids, the product is dried at 102° C. Drying time depends on the specific product and is usually about 3 to 6.5 hours. The total solids content is calculated as the ratio between weight after and before drying.

The rest period is essential in order to form crystals of lactose. A major part of lactose (i.e., at lest 80%), determined as alpha-lactose-monohydrate, must be crystallized before spray-drying of the concentrated whey permeate, in order to obtain a satisfying result after drying.

The crystallization, (e.g. a Terlet crystallization tank) can be carried out between 2° C. and 20° C. At least 80% of the lactose should be in crystal form. The degree of crystallization is determined according to the procedure of K. Roetman and J. J. Mot as disclosed in Voedingsmiddelentechnologie, 7 (1974), W44-W45 (in Dutch language). The crystallization time can be between 2 hours and 24 hours depending on the incoming material. The preferred total solids content prior and after crystallization is 55% or higher, more preferably 60% or higher. Thus, for instance, a mean crystal size $d_{50}$ of 60 µm and $d_{90}$ of 200 µm can be obtained.

d) Spray-Drying the Whey Permeate

The partially crystallized whey permeate from step c) is spray-dried under following conditions:

Inlet air temperature: 160-190° C., preferably 170-185° C. more preferably 180-185° C.; and Outlet temperature: 70-90° C., preferably 75-85° C., more preferably 80-85° C.

For this process step, a spray dryer with or without integrated fluid beds (external or internal) can be used. Such apparatus are commercially available.

II. Modified Whey Powder

The MWP according to the present invention can be characterized by the following parameters:

Lactose content: 80-95%, preferably 85-95%, most preferably 85-90%;

Protein content: 0-3%, preferably 0.5-2%, most preferably 0.5-1.5%; and

Ash content: 0.5-2%, preferably 0.5-1.5%, most preferably 0.9%-1.5%.

In particularly preferred embodiments, the ash content is further specified in that the following components are present in the following ranges:

Sodium: 6000 mg/kg or less, more preferably 5000 mg/kg or less;

Chloride: 3620 mg/kg or less, more preferably 1000 mg/kg or less; and

Potassium: 10000 mg/kg or less, more preferably 4000 mg/kg or 25 less

The protein content can be determined by the Kjeldahl method.

The lactose content can be determined by hydrolyzing it to D-glucose and D-galactose using the enzyme 3-galactosidase and water. D-galactose is oxidized by nicotinamide-adeninedinucleotide (NAD) to D-galactonic acid in the presence of the enzyme (3-galactose dehydrogenase (Gal-DH)). In this step, NADH is formed in an amount stoichiometric to the amount of D-galactose. The additional absorbance of NADH at a wavelength of 340 nm compared to the oxidized form NAD allows the determination of the lactose amount by means of the increase of the absorbance at 340 nm.

The ash content can be determined by ashing the sample in a muffle oven at 550° C. and calculating the ratio of the weights after ashing before ashing.

The content of potassium and sodium can be analyzed by inductively coupled plasma mass spectroscopy (ICP-MS).

The content of chloride can be determined by titration.

III. Products Containing the Modified Whey Powder

The MWP obtainable by the process according to the present invention is suitable as an ingredient of compositions for the manufacture of confectionery, biscuits, products with low water content, (e.g., crackers) and products where a salty or metallic taste affects organoleptic perception. It can be used to replace sugar, sweet whey powder (SWP), and/or as skim milk powder (SMP). In particular, it can replace sugar and/or SWP without negative effects on organoleptic properties (e.g., flavour and mouthfeel) of such products.

A preferred product comprising the MWP of the present invention is chocolate. In consumer tests, chocolate formulations in which at least part of the sugar and SMP was replaced with MWP according to the present invention have organoleptic properties similar to, or even better than, standard formulations.

A particularly preferred chocolate formulation comprises from about 6 to 20% by weight of MWP according to the present invention. Thus, the content of sugar and SWP can be reduced by about 20% by weight. A typical chocolate formulation might comprise about 28% cocoa ingredient (cocoa and cocoa butter) about 40% sugar, about 16% milk ingredient (skimmed milk powder and anhydrous milk fat) and about 6% MWP.

EXAMPLES

Processing of MWP from whey permeate Ten MWP batches were produced from whey permeate according to the following procedures, wherein "yes" indicates the step was included and "no" indicates the step was not included.

b) Heat/pH Treatment

Directly after pasteurization and cooling, the pH of 15,000 L of pasteurized whey permeate was adjusted to pH 8.0 with aqueous NaOH (concentration of NaOH: 33% by weight). After storage overnight, the pH had decreased to 7.7 and the pH was re-adjusted to 8.0. In total, 65.7 kg of NaOH (concentration of NaOH: 33% by weight) was added.

The temperature of whey was increased to 61-63° C. by means of an APV heat exchanger having a capacity of 5500 L/h. The heat exchanger was fouled by calcium phosphate precipitating from the whey permeate. After pasteurization of 7,500 L of whey permeate, the heat exchanger was cleaned with nitric acid. No additional cleaning was necessary for heating of 15,000 L of whey permeate.

After about 30 minutes, the heated whey permeate was centrifuged in a bactofuge (Westfalia Separator AG) having a capacity of 4,500 L/h. Every 600 seconds the sediment was removed with about 11 L of water. After centrifugation, the visible remaining calcium phosphate in the supernatant was determined with a laboratory centrifuge (6 min, 3,300 G). After centrifugation, the pH value of the supernatant of batches M3 and M8 was decreased to 5 using aqueous HCl (concentration of HCl: 33% by weight).

c) Ion Exchange

Pasteurized whey permeate was demineralized on a cation exchanger (Lewatit resin 5100 (KI)) and an anion exchanger (Lewatit resin MP62 (Al)). Conductivity, Brix value and pH of the whey permeate were checked regularly (every 6 minutes during the run) in order to determine whether the capacity of the ion exchange columns was still sufficient to remove the ions. The temperature of the whey permeate remained between 4 and 10° C. during the process and the sample was cooled with ice water to 4° C. after ion exchange.

The columns were rinsed with water and the diluted whey was collected until a Brix value of 5° Bx was reached. The capacity of the ion exchange columns decreased after the first

|  | | | | | Comparative Examples | | | | | |
| --- | --- | --- | --- | --- | --- | --- | --- | --- | --- | --- |
| Step | M1 | M2 | M3 | M4 | M5 | M6 | M7 | M8 | M9 | M10 |
| Pasteurization | Yes | Yes | Yes | No | Yes | No | Yes | Yes | Yes | Yes |
| Heat/pH treatment | No | No | Yes | No | Yes | No | No | Yes | No | Yes |
| Ion Exchange | Yes | No | No | No | No | Yes | No | No | No | No |
| Nanofiltration | No | Yes | Yes | No | No | No | Yes | Yes | No | No |
| Evaporation | Yes | Yes | Yes |  | Yes | Yes | Yes | Yes | No | No |
| Crystallization/spray drying | Yes | Yes | Yes | Yes | Yes | No | No | No | No | No |
| Roller drying | No | No | No | No | No | Yes | Yes | Yes | Yes | Yes |

Examples M2-M10 are considered comparative examples since the ion-exchange and/or crystallization steps were omitted.

Description of the individual processing steps.

Only those steps indicated in the above Table were included in each run.

a) Pasteurization 25,000 L of whey permeate were provided in two trucks at a temperature of 8.2° C. and 8.1° C., respectively. After unloading and prior to processing, the whey permeate was pasteurized for 13.5 seconds at 74° C. in a pasteurizer (Alfa Laval) having a capacity of 10,000 L/h. After pasteurizing, the whey permeate was cooled to about 4° C.

run. The regeneration procedure was extended to increase the capacity of the columns. During the first runs the anion exchange column was the limiting column since it was the slowest step. The output of the ion exchange runs for inventive sample M1 and comparative sample M6 are given in the following table:

| Batch | Run 1 | Run 2 | Run 3 | Run 4 | Total |
| --- | --- | --- | --- | --- | --- |
| M1 | 400* | 580 | 700** | 700** | 2380 |
| M6 | 750 | 630 | 580 | 160* | 2120 |

*desalted whey permeate was divided over batches M1 and M6
**decrease in product flow to 30% of maximum flow after about 45 minutes In order to increase the overall capacity, the product flow in the second part of the runs was decreased. This resulted in an increase in binding capacity of the columns by more than 20%. The demineralized whey permeate had the following properties:

| Cation exchange: | |
|---|---|
| pH start | 1.5-2.0 |
| pH end | 2-4 |
| Conductivity start | 10-11 mS |
| Conductivity end | 6-10 mS |
| Solids content start | about 8.5° Bx |
| Solids content end | about 8.5° Bx |
| Anion exchange: | |
| pH start | about 10 |
| pH end | about 4.5 |
| Conductivity start | about 1.1 mS |
| Conductivity end | about 1.3 mS |
| Solids content start | about 7.5° Bx |
| Solids content end | about 8.0° Bx | b) Nanofiltration

The whey was partly desalted and concentrated on a two-stage nanofiltration unit using the following membranes (in parallel and/or in series):

| | | | | |
|---|---|---|---|---|
| 1.1 | Desal 5 DK 38-40 C | 5.6 m$^2$ | spiral wound | Osmonics |
| 1.2 | NF-3838/48 FF | 5.6 m$^2$ | spiral wound | Filmtec (Dow Chemical) |
| 2.1 | Desal 5 DK | 5.6 m$^2$ | spiral wound | Osmonics |
| 2.2 | NF-3838/48 FF | 5.6 m$^2$ | spiral wound | Filmtec, Dow Chemical |

All batches were demineralized with a product flow of about 350 L/h and a retenate flow of about 95 L/h as shown in the following table:

| | Batch | |
|---|---|---|
| | M3* + M8* | M2* + M7* |
| Product flow 1.1 [L/h] | 350-330 | 35-300 |
| Permeate flow 1.1 [L/h] | 90-85 | 90-77 |
| Permeate flow 1.1 [L/h] | 105-95 | 100-78 |
| Permeate flow 1.1 [L/h] | 29-32 | 30-29 |
| Permeate flow 1.1 [L/h] | 18-32 | 15-30 |
| Retentate flow [L/h] | 93-82 | 99-83 |
| Pout end of run [bar] | 40.3 | 39.7 |
| Volume before nanofiltration [L] | 4500 | 4270 |
| Volume after nanofiltration [L] | 1205 | 1195 |
| Concentration factor | 3.7 | 3.6 |
| Solids content end [° Bx] | 27 | 27 |

*comparative example

The temperature of the whey permeate was increased to about 10° C. before nanofiltration and cooled with ice water to about 4° C. after nanofiltration.

e) Evaporation

Inventive samples M1 and comparative examples M4-M6, M9, and M10 were heated to ca. 74° C. before evaporation on a 4-stage falling film evaporator (NIR0250). The product flow was about 1,700 L/h. Only two stages were used because the amount of whey permeate was too small to use the complete capacity of the evaporator.

Comparative batches M4 and M9, M5 and M10 were pooled and evaporated in two steps. After concentrating the batches were split. Batches M9 and M10 were kept at 60° C. and roller dried on the same day and batches M4 and M5 were transferred to the crystallization tank.

Batches M1 and M6 were preconcentrated to 23-31° Bx and further concentrated on a different 4-stage falling film evaporator (Holvrieka).

Batches M1 to M3 and M6 to M8 were concentrated to about 52-55° Bx. These batches were heated to about 74° C. before being evaporated on a 4-stage falling film evaporator (Holvrieka). Product flow was about 260-320 L/h. Using this evaporator, the batches could be successfully evaporated. Batches M2 and M7 which were only demineralized by means of nanofiltration, gave some fouling (white precipitate, presumably caused by calcium phosphate deposition).

Processing parameters employed for operating the NIR0250 evaporator are shown in the following table:

| | Starting Amount [L] | Solids at start [° Bx] | Content at end [° Bx] |
|---|---|---|---|
| M1 | 2400 | 7 | 28* |
| M6* | 2115 | 8 | 23 |
| M4** + M9** | 4500 | 7 20 | 2053 |
| M5** + M10** | 4800 | 8 22 | Batch |

*achieved with circulation in evaporator
**comparative example

Processing parameters employed for operating the Holvrieka 25 evaporator are shown in the following table:

| | | Solids content | |
|---|---|---|---|
| Batch | Starting Amount [L] | at start [° Bx] | at end [° Bx] |
| M1 | 640 | 28 | 52 |
| M2* | 560 | 25 | 54 |
| M3* | 600 | 26 | 52 |
| M6* | 600 | 23 | 52 |
| M7* | 620 | 25 | 53 |
| M8* | 575 | 25 | 53 |

*comparative examples; for M2 and M7, a white precipitate formed and acid cleaning was necessary after 2 hours f) Lactose Crystallization/Spray Drying The concentrated whey permeate was held at a temperature of about 60° C. during transportation to crystallization tank(s) in order to avoid premature lactose crystallization outside of the tanks. The whey permeate was quickly cooled to 4° C. and stirred overnight at 4° C.

The batches were crystallized in a crystallization tank having a capacity of 1,000 L (Terlet). After 4 hours of crystallization in the tank, 220 L of batch M4 was transported to two tanks having a capacity of 110 L each (Terlet).

After overnight crystallization, the samples taken from each batch were analyzed using a light microscope. Almost all the crystals were smaller than 100 μm and tomahawk-shaped. In batch M2 larger crystals, presumably partly composed of calcium phosphate, were present. After heating the sample to 90° C., the lactose crystals dissolved (checked by means of the refractive index), but the supernatant remained turbid. The crystals from batch M1 were the smallest. This lactose solution contained the smallest amount of minerals and the crystals formed faster than in the other concentrated whey solutions.

The batches were spray-dried using a NIRO25 spray-dryer equipped with a rotating wheel atomizer. The speed of rotation was 19,000 rpm. Further spray drying parameters are shown in the following table:

|    | Preheat temperature [° C.] | Permeate flow [L/h] | Outlet temperature [° C.] | Moisture content [%]+ | Amount of powder [kg] | Amount of swept powder [kg] |
|----|-----|----|-------|-----|--------|---------|
| M1 | 32 | 45 | 89 | 4.5 | 125 | — |
| M2* | 32 | 52 | 89 | 4.3 | 25 | 77 |
| M3* | 32 | 48 | 88-89 | 4.2 | 100 | 21 |
| M4* | 29 | 52 | 88 | 4.4 | ca. 20 | ca. 80++ |
| M5* | 32 | 52 | 88 | 4.3 | — | ca. 100 |

*comparative example
+determined by Karl-Fischer titration
++including large lumps Observations:

Batch M1: After 1 hour some fouling of the cone occurred which could be easily cleaned. This may have been due to the warm and rainy weather during this run.

Batch M2: After 3 hours the drying process was stopped because too much fouling occurred. Powder could easily be swept from the wall of the cone.

Batch M3: Drying could be carried out for a maximum of 5 hours due to fouling of the cone. In the bottom of the cone some lump formation and brown decolorization was observed.

Batch M4: Very sticky and difficult to dry. Fouling of the cone occurred. Decrease in outlet temperature to 85° C. gave more lump formation. Drying was stopped and the cone was cleaned after 2 hours.

Batch M5: Very sticky and difficult to dry. The drying process was stopped 3 times after 1 hour each and the powder was swept. In the cone a powder layer of about 1.5 cm was formed.

The outlet temperature appeared to be very critical. If the outlet temperature was higher than approximately 90-92° C., the powder became more rubbery and sticky. If the outlet temperature was lower than 86° C. the powder was too wet and became sticky as well.

The particle size of the different powders is given in the following table:

| Batch | D (50%) (µm) | D (10%) (µm) | D (90%) (µm) |
|-------|-----|-----|-----|
| M1 | 72 | 27 | 134 |
| M2* | 66 | 18 | 136 |
| M3* | 64 | 16 | 131 |
| M4* | 50 | 15 | 698 |
| M5* | 40 | 12 | 102 |

*comparative example

D (100%) means that 10% (of the whole volume or mass) of the particles below a certain value (e.g. 27 micrometer in batch M1); D (50%) means that 50% (of the whole volume or mass) of the particles are below a certain value (e.g., 72 micrometer in batch M1); and D (90%) means that 90% (of the whole volume or mass) of the particles are below a certain value (e.g., 134 micrometer in batch M1)

g) Roller Drying

The concentrated batches were dried on a drum dryer type T5/5 from GMF Gouda having a total surface of 1.5 m². The flakes were milled using a powder mill from GMF Gouda.

The following processing parameters were employed:

|  | M6 | M7 | M8 | M9 | M10 |
|--|----|----|----|----|-----|
| Steam pressure (bar) | 3 | 3.4-4 | 3-3.4 | 2.5 | 2.5 |
| Drum speed (rpm) | 1.71 | 3-4 | 1.71 | var. | var. |
| Distance of drums (mm) | 0.2 | 0.2 | 0.1-0.3 | var. | var. |
| Gap width (mm) | 50-100 | 40 | 50-100 | 100-500 | 100-500 |
| Feed temperature (° C.) | 65-80 | 66-76 | 65-89 | 92 | 92 |
| Temperature of knife (° C.) | ca. 99 | — | — | — | — |
| Product temperature (° C.) | ca. 74 | — | ca. 70 | — | — |
| Structure/color | Yellow golden flakes | Yellow golden flakes | Yellow golden flakes | Dark liquid | Dark liquid |
| Capacity (kg/h) | 20 | 20 | 15-20 | — | — |
| Dry Matter (%) | 0.4-1.0 | 1.5-2.2 | 1.8-3.3 | 2.7 | n.d. |
| Product (kg) | 108 | — | — | 0 | 0 |

Batches M9 and M10 contained the largest amount of salt and no flakes could be obtained, although the processing conditions (steam pressure, drum speed, gap width, feed temperature) were varied.

Batch M6 provided good dry flakes.

Batches M7 and M8 were slightly more sticky and brown after production. Presumably, this related to the higher amount of minerals.

The layer of product on the drums depended on the viscosity and dry matter content of the product in the gap and on the gap width. In order to achieve a good and constant powder quality, the gap between the drums had to be small to minimize moisture loss and brown discoloration. The gap width had to be constant in order to achieve a constant layer thickness on the drums. During the production, the holes became partly blocked by the formation of lactose crystals which were removed manually.

Modified Whey Powder

Thus, modified whey powder batches were obtained which had the following composition:

| Batch | Protein (%) | Lactose (%) | Ash (%) | Potassium (mg/kg) | Sodium (mg/kg) | Chloride (mg/kg) |
|-------|-----|-----|-----|------|------|------|
| M1 | 2.0 | 90.7 | 1.0 | 2420 | 736 | <30 |
| M2 | 2.31 | 71.20 | 4.62 | 11600 | 2450 | 380 |
| M3 | 2.58 | 79.00 | 4.76 | 13400 | 6410 | 620 |
| M4 | 4.69 | 67.60 | 1.21 | 38700 | 8790 | 2490 |
| M5 | 2.57 | 76.00 | 8.14 | 25100 | 12100 | 1630 |
| M6 | 1.98 | 85.10 | 1.64 | 1960 | 700 | 30 |
| M7 | 2.61 | 82.40 | 5.37 | 14600 | 3070 | 40 |
| M8 | 2.69 | 75.30 | 4.73 | 14700 | 7060 | 620 |

The differences between inventive sample M1 and comparative examples M2-M8 are clearly shown with M1 having significantly more lactose and significantly less minerals.

Chocolate Formulations:

The following formulations were prepared using the various batches of MWP and tested for consumer acceptance. All formulations were moulded into 100 g size format.

|  |  | Amount of ingredient |  |  |  | Ratio of components [%] |  |  |
|---|---|---|---|---|---|---|---|---|
| Sample No. | MWP batch | Cocoa Ingredients (%) | Sucrose | Milk Ingredients (%) | MWP | α-lactose/ total lactose | minerals/ lactose total | monovalent ions/all ions |
| 1 | — | 27.7 | 45.3 | 17.3 | — | n.a. | n.a. | n.a. |
| 2 | — | 27.7 | 45.3 | 17.3 | — | n.a. | n.a. | n.a. |
| 3 | M1 | 27.7 | 40.5 | 16.1 | 6 | 82 | 0.90 | 31.5 |
| 4 | M2 | 27.7 | 40.5 | 16.1 | 6 | 88 | 3.79 | 53.5 |
| 5 | M6 | 27.7 | 40.5 | 16.1 | 6 | 15 | 1.05 | 30.2 |
| 6 | M7 | 27.7 | 40.5 | 16.1 | 6 | 17 | 4.02 | 53.4 |
| 7 | M8 | 27.7 | 40.5 | 16.1 | 6 | 13 | 3.86 | 77.04 |
| 8 | M1 | 28.2 | 40 | 16.13 | 6 | 82 | 0.90 | 31.5 |
| 9 | M6 | 28.2 | 40 | 16.13 | 6 | 15 | 1.05 | 30.2 |
| 10 | M6 | 27.7 | 37.2 | 15.34 | 10 | 15 | 1.05 | 30.2 |

Samples 1 and 2 were controlled prepared without any MWP; Sample 2 was remolded. Samples 3 and 8 were prepared with inventive MWP from batch M1. Samples 4-7, 9, and 10 were prepared using comparative MWP from batch M2 and M6-M8.

Test Procedure:

Consumers (N=150) were invited to evaluate the chocolate formulations on basis of five criteria. A nine-point hedonic scale (9 being best) was employed for evaluation.

|  | Liking |  |  |  |  |
|---|---|---|---|---|---|
| Sample No. | overall | melting in mouth | sweetness | milk flavour | chocolate flavour | after-taste |
| 8 | 7.05 | 6.93 | 6.68 | 6.93 | 6.68 | 6.78 |
| 3 | 6.81 | 6.45 | 6.58 | 6.72 | 6.50 | 6.62 |
| 1 | 6.81 | 6.68 | 6.57 | 6.53 | 6.49 | 6.50 |
| 2 | 6.81 | 6.58 | 6.59 | 6.75 | 6.56 | 6.63 |
| 10 | 6.78 | 6.56 | 6.49 | 6.72 | 6.61 | 6.69 |
| 9 | 6.77 | 6.57 | 6.66 | 6.91 | 6.47 | 6.77 |
| 7 | 6.75 | 6.34 | 6.44 | 6.60 | 6.38 | 6.30 |
| 5 | 6.66 | 6.45 | 6.30 | 6.58 | 6.32 | 6.40 |
| 4 | 6.58 | 6.21 | 6.42 | 6.49 | 6.34 | 6.31 |
| 6 | 6.54 | 6.51 | 6.28 | 6.56 | 6.23 | 6.32 |

As a result, chocolate formulations no. 3 and 8, both containing inventive MWP (M1) were evaluated as best accepted by consumer in terms of overall liking. Indeed, the inventive MWP (M1) produced chocolate products which were as good as and even better than comparative control 1 and 2 which were prepared without any MWP.

The invention claimed is:

1. A process for producing modified whey powder from whey permeate or blends thereof, said process comprising the steps of:
   (a) providing whey permeate or blends thereof having an ash to lactose ratio of 0.13 or higher;
   (b) demineralising the whey permeate or blends thereof with an ion exchange process to provide a demineralized whey permeate mixture;
   (c) evaporating water from the demineralized whey permeate mixture to provide a concentrated demineralized whey permeate mixture;
   (d) crystallizing at least partly the lactose contained in the concentrated demineralized whey permeate mixture to produce a second mixture having at least 80% of the lactose in crystallized form; and
   (e) spray-drying the second mixture to produce the modified whey powder having about 80% to about 95% lactose, about 0.5% to about 2% protein and about 0.5% to about 2% ash.

2. The process according to claim 1, wherein DD is calculated using the equation $$DD=(IB-IA)/IB$$

wherein IB is the concentration of ions in mol/l in the whey permeate or blends thereof before the ion exchange step and IA is the concentration of ions in mol/l in the demineralized whey permeate mixture after the demineralized step (b).

3. A process for producing modified whey powder from whey permeate or blends thereof, said process comprising the steps of:
   (a) providing whey permeate or blends thereof having an ash to lactose ratio of at least 0.13;
   (b) demineralising the whey permeate or blends thereof with an ion exchange process to provide a demineralized whey permeate mixture having a degree of demineralization (DD) of about 80% to about 95%, DD being calculated as:

$$DD=(IB-IA)/IB$$

wherein IB is the concentration of ions in mol/l in the whey permeate before the demineralising step and IA is the concentration of ions in mol/l after the demineralising step;
   (c) crystallizing at least partly the lactose contained in the demineralized whey permeate mixture to produce a second mixture; and
   (d) spray-drying the second mixture to produce the modified whey powder.

4. The process according to claim 3, wherein in step (c) at least 80% of the lactose is crystallized.

5. The process according to claim 3 further comprising the step of incorporating the modified whey powder in chocolate.

6. The process according to claim 1 further comprising the step of incorporating the modified whey powder in chocolate.

* * * * *